United States Patent [19]

Beer

[11] Patent Number: 4,643,270

[45] Date of Patent: Feb. 17, 1987

[54] MOTOR VEHICLE DRIVE UNIT SUPPORT ARRANGEMENT

[75] Inventor: Wilhelm Beer, Russelsheim, Fed. Rep. of Germany

[73] Assignee: General Motors Corporation, Detroit, Mich.

[21] Appl. No.: 792,194

[22] Filed: Oct. 28, 1985

[30] Foreign Application Priority Data

Mar. 22, 1985 [DE] Fed. Rep. of Germany ....... 3510335

[51] Int. Cl.⁴ .............................................. B60K 5/12
[52] U.S. Cl. ..................................... 180/299; 180/312; 180/902
[58] Field of Search ............... 180/312, 902, 299, 291; 280/710, 715

[56] References Cited

U.S. PATENT DOCUMENTS 2,746,556  5/1956  Nallinger ............................ 180/291
3,970,162  7/1976  Le Salver ........................... 180/291

FOREIGN PATENT DOCUMENTS 2284476  9/1976  France ................................ 180/291
0144126  9/1982  Japan ................................. 180/291
 851873 10/1960  United Kingdom ................. 180/291
0707835  1/1980  U.S.S.R. ............................. 180/902

Primary Examiner—David M. Mitchell
Attorney, Agent, or Firm—R. L. Phillips

[57] ABSTRACT

In a motor vehicle, the drive unit is suspended on a transverse member resting on the wheel suspension struts of the vehicle. The suspension struts are secured to the vehicle body by means of a suspension mount which includes a damping block. The suspension mount has an inner portion connected with the suspension strut, an intermediate portion connected with the transverse member, and an outer portion connected with the vehicle body. The inner portion, the intermediate portion and the outer portion are joined to each other through a rubber member which is loaded, substantially, in shear.

4 Claims, 4 Drawing Figures

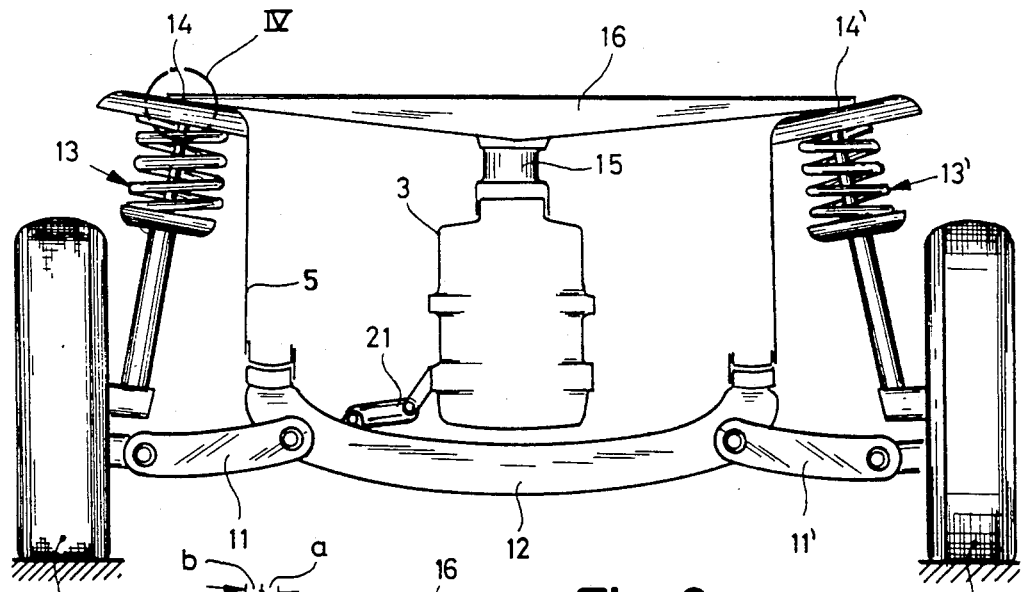
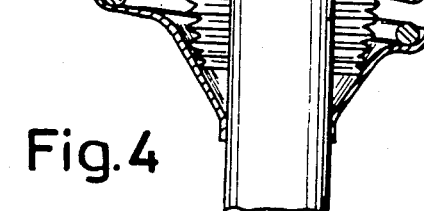
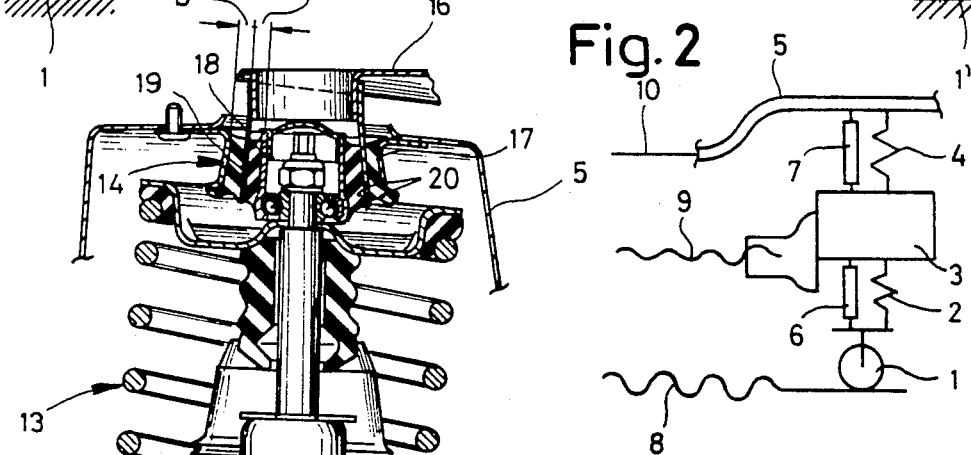
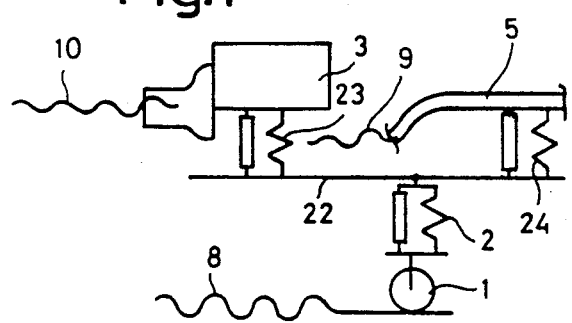

MOTOR VEHICLE DRIVE UNIT SUPPORT ARRANGEMENT

TECHNICAL FIELD

The invention relates to a motor vehicle whose drive unit is secured to a transverse member that is elastically supported on the suspension struts of the motor vehicle, and wherein the suspension struts in turn, are supported on the vehicle body by means of respective mounts which are subjected to shear-type stresses.

BACKGROUND OF THE INVENTION

A motor vehicle of the above type is described in French patent publication No. 2 284 476. In the motor vehicle according to this publication, the suspension struts are bearing against the vehicle body by means of respective elastic mounts. The transverse member is supported on the respective upper ends of suspension struts by means of respective damping blocks which are loaded in compression. Therefore, in this arrangement, the mass of the vehicle body and the engine mass are arranged in parallel with one another.

In British Pat. No. GB-PS 851,873, an arrangement is disclosed wherein the transverse member supporting the drive unit is rigidly connected with the suspension struts of the motor vehicle. A form-locking connection of this type provides that the drive unit with its mass can be considered in its entirety as part of the spring mass. This arrangement results in a relatively large ratio between the sprung and the unsprung mass, so that the vibrations induced in the vehicle body by road irregularities are only of a minor nature. However, the drawback associated with this arrangement is that the form-locking connection causes stability problems to occur on the torque transmitting elements, especially the ball bearings of the suspension struts. Another potential problem associated with this construction is that due to the inherent engine vibrations, vibrations are caused in the vehicle body because the vehicle body itself is not directly articulated to a resting subsuspension.

SUMMARY OF PRESENT INVENTION

It is an object of the present invention to incorporate features into a motor vehicle of the type identified in the foregoing which provide that the tendency of the vehicle body to vibrate in response to road irregularity induced vibrations and engine vibrations is significantly reduced. Another object of the invention is to reduce the likelihood of stability problems to occur in the region of the suspension struts.

In accordance with the present invention, these objects are attained by the elastic mount being designed to support the transverse member on respective suspension struts on opposite sides of the vehicle, and also to support the suspension strut on the vehicle body, and wherein the stresses to which the elastic member of the mount is subjected are, substantially, shear-type stresses.

Since the elastic member is primarily subjected to shear stresses, it can be made substantially softer than the damping block according to the French patent publication No. 2 284 476 which is designed to withstand compressive stresses. The important advantage of employing a rubber member that is relatively soft is that it assists in controlling acoustic vibrations and that it prevents stability problems from arising in the region of the suspension struts. Moreover, the front end steadiness can be improved by relatively simple means. Another benefit gained through the arrangement according to the invention is that the vehicle is more compact in the suspension strut area, because there is no need for an additional damping block.

Instead of the transverse member, it is also possible to employ, especially in the case of front-wheel drive vehicles with transversely mounted engines, a pair of individual support bars which are rigidly connected with the drive unit. This arrangement has the effect of better handling loads of different magnitude generated on the left and the right hand side.

An arrangement particularly adapted to cope with conditions of this nature is one wherein the suspension mount has its outer portion connected with the vehicle body, its inner portion with the wheel suspension strut, add its intermediate portion, which is disposed inside a rubber member, with the transverse member. A configuration of this type is simple in structure and enables the lever arm ratio between the outer portion and the intermediate portion supporting the transverse member, as well as between the inner portion and the intermediate portion to be varied, so that an optimum spring characteristic ratio can be selected with respect, on the one hand, to the excitation by the wheels on the vehicle body and, on the other hand, the excitation by the wheels on the engine. The advantage of this feature is particularly significant when the mounts are subjected to different loads.

Double isolation of the drive unit relative to the vehicle body, which enhances the acoustic comfort while maintaining the vibratory comfort, is provided in a relatively simple manner in that the drive unit is suspended on the transverse member by means of resilient engine mounts. The remaining degrees of freedom of the engine/transmission drive unit are controlled by a torque control member on the front axle.

According to another feature of the invention, the suspension mount is of cylindrical cross section, and the outer portion, the inner portion and the intermediate portion are in the form of coaxially arranged sleeves which together results in a relatively simple construction.

DESCRIPTION OF PREFERRED EMBODIMENT OF THE INVENTION

It should be appreciated that a variety of arrangements may be utilized in the practice of the invention. To convey the concept of the invention, one exemplary embodiment is described and illustrated in the drawings wherein:

FIG. 1 is a schematic illustration of the transmission path of the vibrations induced by road irregularities acting on a motor vehicle of the type according to the previously identified French patent publication No. 2 284 476.

FIG. 2 is a schematic illustration of the transmission path of the vibrations induced by road irregularities which are acting on a vehicle of the type according to the present invention.

FIG. 3 is a schematic illustration of the front axle region of a vehicle according to the invention.

FIG. 4 is an enlarged partial sectional view of the upper portion, identified in FIG. 3 by the numeral IV, of a suspension strut of a vehicle according to the invention.

FIG. 1 illustrates schematically a motor vehicle wheel 1 which is suspended by means of a spring 2 on a structural component 22. A drive unit 3 is supported on top of this component 22 by means of a spring 23. The component 22 itself supports the vehicle body 5 through the interposition of a spring 24. Thus, in this arrangement the mass of the drive unit and the mass of the vehicle body are arranged in parallel through the component 22. When the vehicle wheel 1 rolls over a road surface 8, the drive unit 3 vibrates according to curve 10, and the vehicle body 5 will vibrate according to curve 9. The springs 2, 23 and 24 are supplemented by shock absorbers which are symbolically inserted in the drawing parallel to these springs and which represent actual shock absorbers employed in the vehicle or, as the case may be, the shock absorbing characteristics of the springs themselves.

FIG. 2, which is a representation of the conditions prevailing with the arrangement according to the invention, also illustrates schematically the vehicle wheel 1 which is supported by means of the spring 2 on the drive unit 3. The drive unit 3 is connected via spring 4 with the vehicle body 5. Shock absorbers 6, 7 are arranged in parallel with springs 2 and 4, respectively. The wheel 1 rolls over the road 8 and is forced into vigorous up and down deflections in accordance with road irregularities. The mass of the drive unit 3 is counteracting those vibrations, so that the drive unit 3 already vibrates with less intensity than the wheel 1, as indicated by curve 9. Since the drive unit 3 itself is connected with the vehicle body 5 through a spring 4, and since the vehicle body 5 has a relatively large mass, the vehicle body vibrations will only be of a minor nature, as indicated by curve 10 in FIG. 2. Thus, unlike the arrangement described in the foregoing, the present invention provides that the vehicle body and the drive unit 3 are arranged in series.

FIG. 3 illustrates the front axle assembly of a motor vehicle according to the invention. Numerals 1 and 1' designate a pair of front wheels which are each connected by way of respective control arms 11, 11' with a front axle 12. Furthermore, the vehicle wheels 1, 1' are suspended by way of respective suspension struts 13, 13' on the vehicle body 5. Between the upper end of each suspension strut 13, 13' and the vehicle body 5 there is arranged a pair of elastic mounts, 14, 14', respectively.

The drive unit 3 is suspended by way of an elastic engine mount 15 on a transverse member 16 and is connected by way of a torque member 21 to the front axle 12. The transverse member 16 is supported by its respective ends on the elastic mounts 14, 14', which will now be described in greater detail in conjunction with FIG. 4.

FIG. 4 illustrates the upper end of the suspension strut 13, the elastic mount 14, a portion of the vehicle body 5 and the end portion of the transverse member 16. The elastic mount 14 is comprised of an outer portion 17 connected to the vehicle body 5, an inner portion 18 connected to the suspension strut 13 and an intermediate portion 19 which is rigidly connected with the transverse member 16. The outer portion 17, the intermediate portion 19 and the inner portion 18 all have a sleeve-like configuration, are coaxially arranged relative to one another and are connected with one another by an elastomeric member 20 which may be split by the intermediate portion 19 into two annular, coaxially arranged elastomeric portions. Since the forces acting on the rubber member are transmitted exclusively through the lateral surface areas, the rubber member 20 is loaded primarily in shear. The outer member 17, the intermediate member 19 and the inner member 18 are of slightly conical configuration relative to one another, so that the rubber member 20 is also subjected, to a minor extent, to compressive loads, which will increase the service life of the rubber member 20.

The above described preferred embodiment is illustrative of the invention which may be modified within the scope of the appended claims.

The embodiments of the invention in which an exclusive property or privilege is claimed are defined as follows:

1. A motor vehicle whose power unit is mounted on a cross member which is supported elastically on telescopic struts of the motor vehicle, which are in turn supported on a vehicle body in each case by means of an elastic support bearing which is mainly subjected to shear stress, characterized by support bearing means including a first rubber body portion subjected essentially to shear stress for supporting the cross member on a telescopic strut in each case, a second rubber body portion subjected essentially to shear stress for supporting each telescopic strut on the vehicle body, and said rubber body portions and the associated strut all being concentrically arranged with the cross member supported intermediate the strut and vehicle body.

2. A motor vehicle according to claim 1, characterized by the support bearing means connected by an outer portion to the vehicle body, by an inner portion to the telescopic strut and by an intermediate portion and wherein said rubber body portions and outer, inner and intermediate portions all have sleeve-like configurations.

3. A motor vehicle according to claim 1, characterized by the power unit mounted on the cross member by means of elastic engine mountings and connected to the front axle by a torque strut.

4. A motor vehicle according to claim 2, characterized by the intermediate portion being constructed as part of the cross member.

* * * * *